US006873684B1

(12) United States Patent
Tennyson

(10) Patent No.: US 6,873,684 B1
(45) Date of Patent: Mar. 29, 2005

(54) SYSTEM AND METHOD FOR ESTIMATING THE CAPACITY OF A LOCAL LOOP TO CARRY DATA

(75) Inventor: Gary J. Tennyson, Alabaster, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 160 days.

(21) Appl. No.: 10/224,433

(22) Filed: Aug. 21, 2002

Related U.S. Application Data

(63) Continuation of application No. 09/441,466, filed on Nov. 17, 1999, now Pat. No. 6,466,647.

(51) Int. Cl.[7] .......................... H04M 1/24; H04M 3/08; H04M 3/22
(52) U.S. Cl. ..................... 379/1.04; 379/21; 379/27.01; 379/29.01; 379/30; 370/248
(58) Field of Search ............................... 379/1.01, 1.03, 379/1.04, 9, 10.01, 15.01, 15.03, 22.04, 27.01, 29.01, 30; 370/248

(56) References Cited

U.S. PATENT DOCUMENTS

| | | | | |
|---|---|---|---|---|
| 6,266,395 B1 | * | 7/2001 | Liu et al. .................. | 379/27.01 |
| 6,292,539 B1 | * | 9/2001 | Eichen et al. .............. | 379/1.04 |
| 6,456,694 B1 | * | 9/2002 | Posthuma .................. | 379/1.04 |
| 6,463,126 B1 | * | 10/2002 | Manica et al. ............ | 379/27.01 |
| 6,487,276 B1 | * | 11/2002 | Rosen et al. ............... | 379/1.04 |
| 6,625,255 B1 | * | 9/2003 | Green et al. ............... | 379/1.04 |
| 6,633,545 B1 | * | 10/2003 | Milbrandt .................. | 370/252 |
| 6,687,336 B1 | * | 2/2004 | Holeys ...................... | 379/1.04 |

OTHER PUBLICATIONS

Starr, Cioffi and Silverman, "Understanding Digital Subscriber Line Technology," pp. 64–85, Prentice–Hall (1999).
Dr. Walter Y. Chen, "DSL Simulation Techniques and Standards Development for Digital Subscriber Lines," Chapter 3, MacMillan Technical Publishing (1998).
K.F. Sander and G.A.L. Reed, "Transmission and Propagation of Electromagnetic Waves," Chapter 5, Cambridge University Press (1986).

* cited by examiner

*Primary Examiner*—Binh Tieu
(74) *Attorney, Agent, or Firm*—Withers & Keys, LLC

(57) ABSTRACT

A characteristic of a local loop is used to estimate the loop's data carrying capacity. The characteristic is measured and applied to a table previously stored in memory which contains values relating the characteristic to downstream data rates. Using interpolation when required, an estimate of the data carrying capacity of the local loop is estimated based on the measured characteristic. The measured characteristic may be, for example, the input impedance or the DC resistance of the local loop.

16 Claims, 10 Drawing Sheets

SYSTEM AND METHOD FOR ESTIMATING THE CAPACITY OF A LOCAL LOOP TO CARRY DATA

This application is a continuation of U.S. patent application Ser. No. 09/441,466, filed Nov. 17, 1999, now U.S. Pat. No. 6,466,647 which is hereby incorporated by reference herein.

BACKGROUND

1. Field of Invention

The present invention relates generally to the field of data communications. More specifically, the present invention relates to estimating transmission channel data carrying capacity.

2. Description of the Related Art

A conventional telephone system is described with respect to FIG. 1. A central office switch 102 is connected to subscribers 104a–104e via cable pairs 106a–106e respectively. Generally, cable pairs 106a–106e are part of a larger cable that contains many cable pairs, for example, having 300, 600, 1200 or 2400 cable pairs. Cable pairs 106a–106e are also called local loops as they make a loop from the central office to the subscriber and back to the central office.

Conventional local loops are designed to carry telephone traffic in the plain old telephone system (POTS). Consequently, the loops were designed for traffic having frequencies up to approximately 4 KHz. More recent data transmission schemes carry data having significantly higher frequencies. For example, communicating using asymmetric digital subscriber line (ADSL) requires data rates ranging from 25 KHz to 1.1 MHz. As described below, some, but not all, loops in the existing infrastructure can be used to transmit these higher rate data streams.

An additional limitation to the data carrying capacity of some cable pairs is the presence of load coils. Load coils, such as load coils 108a–108c, are inductors spliced into a cable pair along its length to mitigate the effects of cable length on data transmission. Load coils are present only on longer cable pairs. Where load coils are present, however, they limit the pass band of the cable to which they are attached. This is shown in FIG. 2. FIG. 2 illustrates a transfer function (curve 202) representative of a cable having no added load coils. As can be seen, the gradual roll off of the transfer function indicates that higher frequencies are passed by the cable, including frequencies required for higher data rate transmission schemes, including, for example, ADSL.

This gradual rolloff is in sharp contrast to a cable to which load coils have been added, as illustrated by the exemplary transfer function (curve 204) of a cable to which load coils have been added. It can be seen that the transfer function has a sharp cutoff at approximately 3.3 KHz. Consequently, cable pairs having load coils spliced in them cannot be used to carry higher data rate transmissions such as ADSL. Because not all local loops can be used for ADSL, or other high data rate transmission services, when a customer requests ADSL service, the service provider must determine whether the existing lines to the customer can support the relatively high bandwidth requirements of ADSL.

The problem of determining the sufficiency of a local loop's bandwidth, and particularly, whether the local loop has load coils spliced into it, is significant in the industry. Originally, paper records tracked which local loops had load coils. However, today these records are often incomplete, lost or unreliable or otherwise not easily accessible. Thus, they tend to be of little use in responding to a customer's request for high data rate services. Consequently, service technicians must often go to a subscriber's home to test a cable pair to determine if the cable pair can support high data rate services. Sending service technicians to subscriber sites is costly, inconvenient and time consuming.

Conventionally, the presence of load coils is detected by hooking up a test set across the tip and ring of the cable pair to detect the presence of load coils. This test is illustrated in FIGS. 3A to 3C. FIG. 3A shows a non-loaded cable pair. A non-loaded cable pair 302 can be characterized as a series of capacitances 302a, 302b and 302c in parallel as shown in FIG. 3A. The capacitance shown in FIG. 3A is that capacitance between the conductors, which is carefully controlled in the manufacturing process to be within certain limits. The length and gauge of the a particular cable segment gives rise to the capacitance. Curve 320 in FIG. 3C illustrates graphically a representative dependency of the impedance on frequency for cable pair 302. From the Figure, it can be seen that the dependency has a form characteristic of a capacitor. This is because as the frequency increases, the impedance decreases and asymptotically approaches the characteristic impedance of the cable. In the present example, the characteristic impedance is 100 ohms, shown by line 321.

A loaded pair, on the other hand, includes inductors 304a and 304b (load coils) in series as shown in FIG. 3B, in addition to capacitances 302a, 302b and 302c. Curve 322 in FIG. 3C illustrates graphically a representative dependency of impedance on frequency for a local loop with a single load coil. There is a peak 324 in curve 322. Peak 324 is present due to a tuned circuit that arises from the inductor-capacitor combinations, e.g., inductor 304a and capacitor 302b. The frequency at which the apex of the peak occurs is called the resonant frequency. The resonant frequency is the frequency at which the circuit is said to be "tuned." Thus, the presence of load coils can be determined by detecting the presence of a tuned circuit in the cable pair.

BRIEF SUMMARY OF THE INVENTION

The present invention is a system and method for estimating the transmission capability of a local loop. The transmission capability is determined by examining a characteristic of the local loop. In the preferred embodiment, the measured characteristic is applied to a table stored in computer memory. Each entry in the table contains a value of the characteristic and a value that relates the measured characteristic to the data carrying capacity of the local loop.

In one preferred embodiment of the present invention, this characteristic is the input impedance of the local loop. In this preferred embodiment, the input impedance, $Z_{in}$, of the cable pair making up the local loop is measured. From this measurement, $RE\{\tanh^{-1}(1/Z_{in})\}$ is calculated. The resulting value is applied to a table stored in computer memory that contains predetermined values of $RE\{\tanh^{-1}(1/Z_{in})\}$ and the downstream data rate corresponding to those values to obtain an estimate of the data carrying capacity of the local loop being tested. In an alternative embodiment of the present invention, the DC resistance of the local loop is measured and used as the characteristic.

In a preferred embodiment of the present invention, the downstream data rate values that are stored in the table are determined using a cable emulator. In an alternative embodiment, the data rate is calculated based on predetermined cable parameters used to make the cable pair model. In either case, input impedances are calculated at multiple frequencies in the voice band (0 KHz–4 KHz). From the results, a frequency is selected at which to calculate $\text{RE}\{\tanh^{-1}(1/Z_{in})\}$ for each cable emulated to create the table data. Preferably, the frequency chosen is such that the $\text{RE}\{\tanh^{-1}(1/Z_{in})\}$ at that frequency has a substantially linear relationship with the corresponding calculated or measured downstream data rate for the cable.

Thus, one object of the present invention is to facilitate the determination of local loop data carrying capacity of the local loop.

Another object of the present invention is to estimate the data carrying capacity using a characteristic of the local loop.

Another object of the present invention is to estimate the data carrying capacity using input impedance.

Another object of the present invention is to estimate the data carrying capacity using DC resistance.

Another object of the present invention is to estimate the data carrying capacity of the local loop remotely, that is, without having to dispatch a service persons to a subscriber's premises.

Another object of the present invention is to determine the presence of load coils on a local loop in a cheap, quick and efficient manner.

These and other objects of the present invention are described in greater detail in the detailed description of the invention, the appended drawings and the attached claims.

DETAILED DESCRIPTION OF THE PREFERRED EMBODIMENTS

Figure 1:
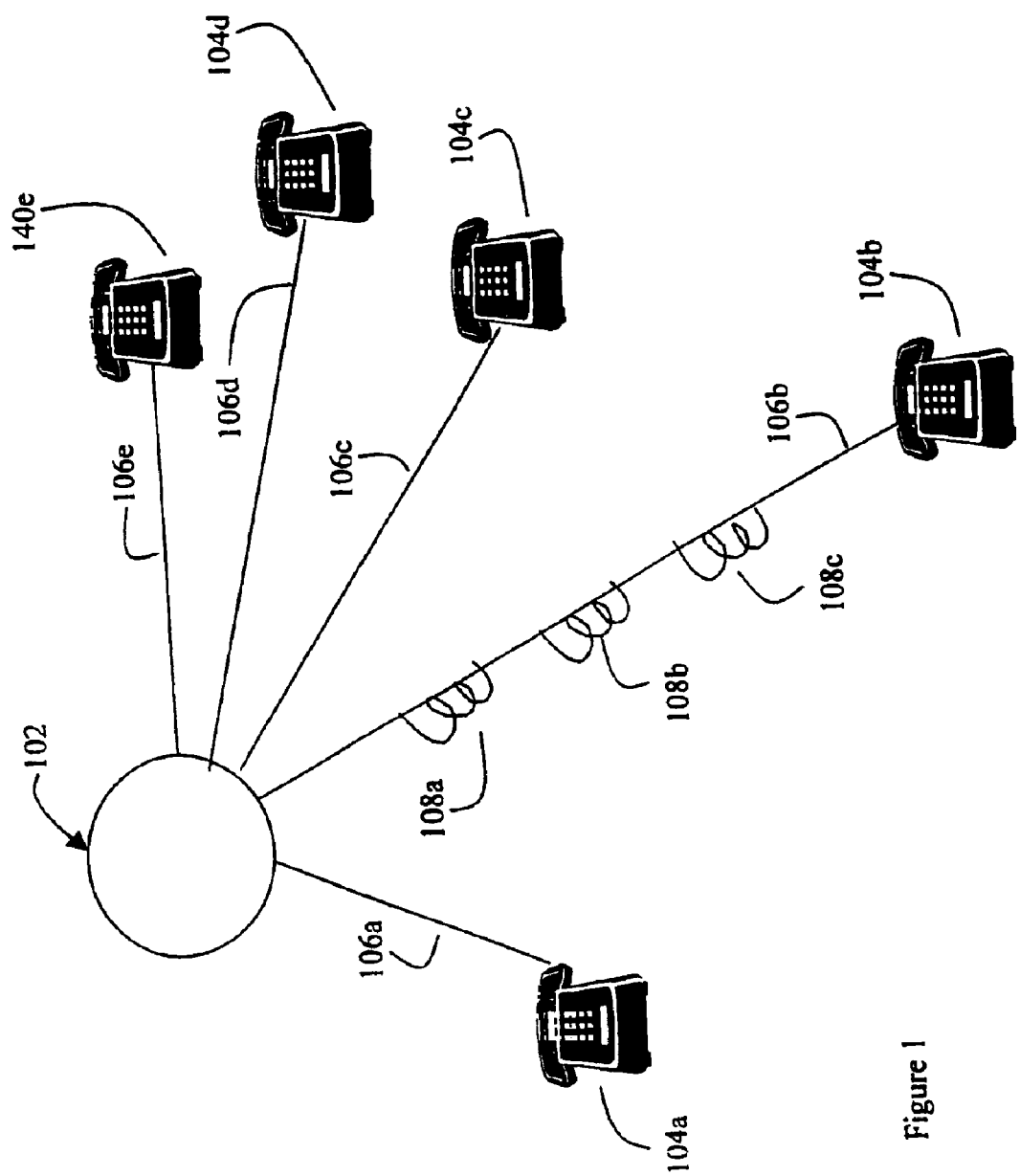
FIG. 1 is a schematic illustration of a portion of a conventional telephone system.
Figure 2:
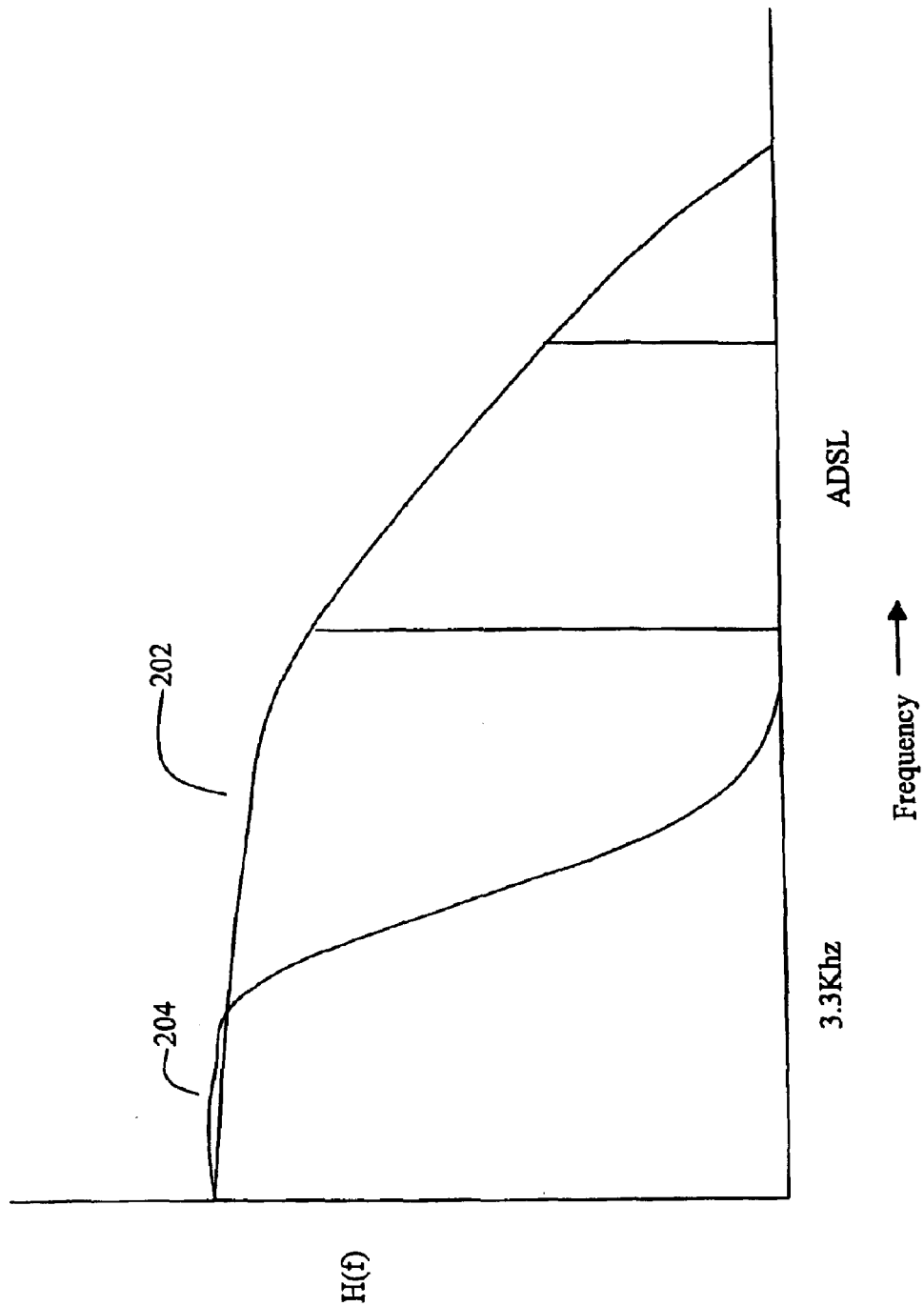
FIG. 2 illustrates graphically a transfer function characteristic of a local loop having a spliced load coil and a local loop without a spliced load coil.
Figure 3A:
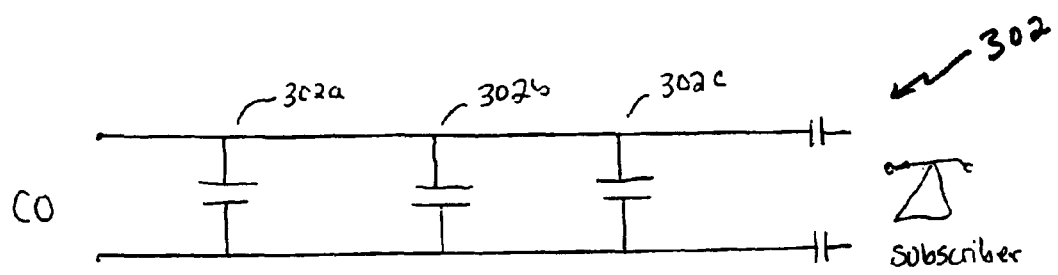
FIG. 3A illustrates schematically a cable pair having no load coils.
Figure 3B:
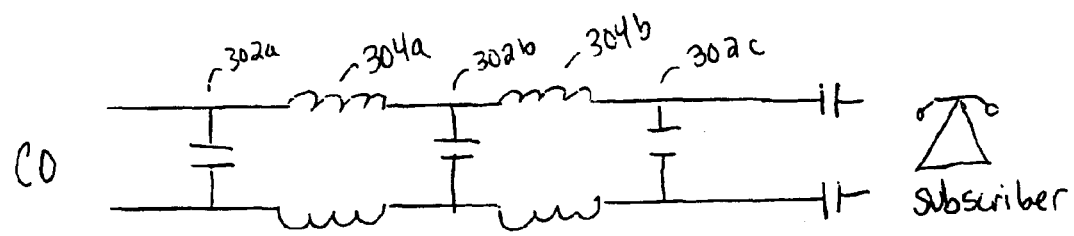
FIG. 3B illustrates schematically a cable pair having load coils.
Figure 3C:
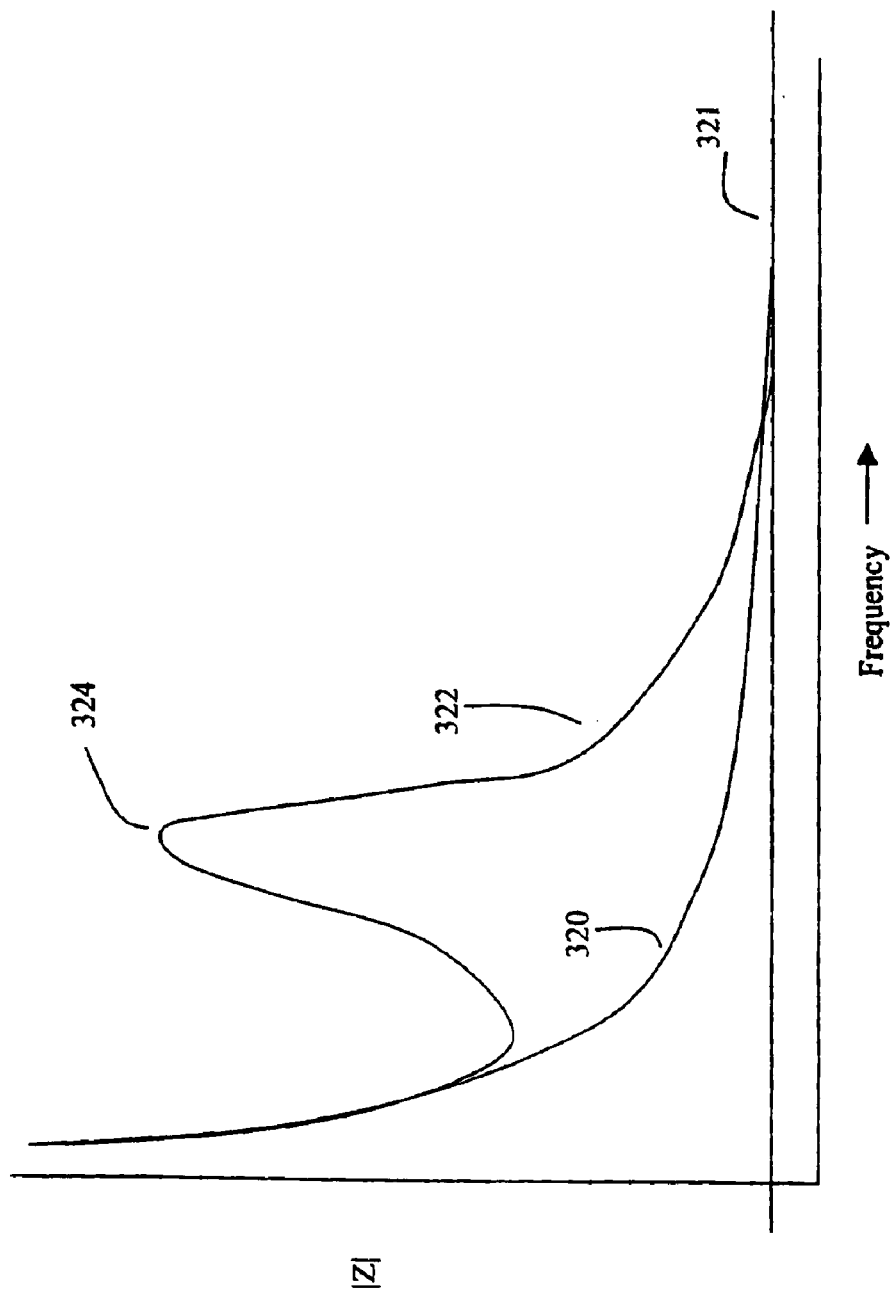
FIG. 3C illustrates the impedance characteristic of a loaded and non-loaded cable pair.
Figure 4:
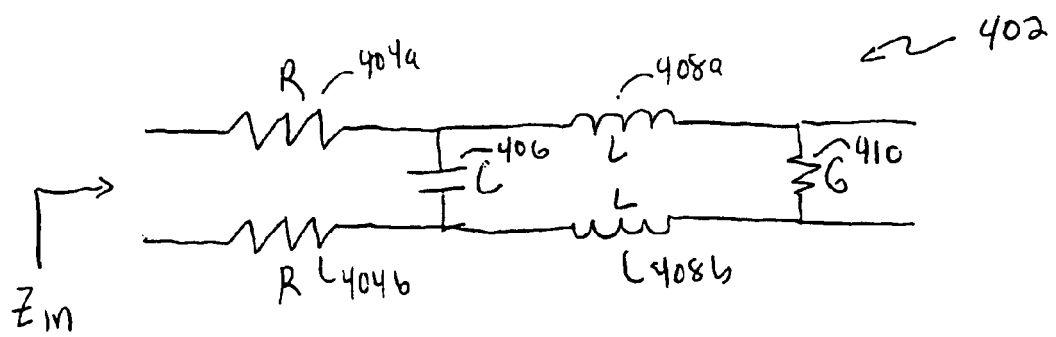
FIG. 4 is a schematic illustration of a model of a cable pair.

The present invention uses a characteristic of the local loop to estimate its transmission capability. Preferably, the characteristic is the input impedance of a cable pair. The terms "cable pair" and "local loop" are used interchangeably throughout this specification. Transmission capability refers to the bandwidth, and correspondingly, to the data rates or data carrying capacity that can be supported by the cable pair. FIG. 4 is a model of a transmission line 402. Transmission line 402 can be, for example, a local loop. Transmission line 402 is modeled as having a resistance, R, 404a and 404b, a capacitance, C, 406, an inductance, L, 408a and 408b and a conductance, G, 410. The inductance 408a and 408b differ from the load coils discussed above in that capacitance 404 and inductance 408a and 408b do not vary much for a given cable gauge and shunt conductance. Consequently, the dominant effect on the input impedance arises from the resistance 404a and 404b. Mathematically, the effect of the resistance 404a and 404b on the input impedance of the transmission line is $\text{RE}\{\tanh^{-1}(1/Z_{in})\}$, where $\text{RE}\{x\}$ indicates the real part of x. A brief derivation is explained below. A more detailed development of transmission line theory is found in K. F. Snader and G. A. L. Reed, *Transmission and Propagation of Electromagnetic Waves*, (Cambridge University Press 1987), which is incorporated by reference herein in its entirety.

Every transmission line has a propagation constant which, in general is a function of frequency. It is a complex number whose real component, α, is the attenuation, in nepers per unit length, and whose reactive component, β, is the phase shift in radians per unit length. The product of the real component, α, and the length of the line is the quantity of interest, as this quantity is related to the end-to-end loss of the line at that frequency.

In the preferred embodiment, the measurement is made in the voiceband (i.e., 0 KHz–4 KHz). Consequently, the loss of the line at ADSL frequencies is not directly available. However, the nature of the makeup of local loops provides some relationship between the loss of the line in the voiceband and the loss of the line at ADSL frequencies. The following derivation provides an estimate of the loss in the voiceband.

It is well known that the input impedance of the transmission line, $Z_{in}$, with a characteristic impedance, $Z_o$, when terminated in an arbitrary impedance, $Z_{load}$, has the following relationship:

$$Z_{in} = Z_o \frac{Z_{load} + Z_o(\tanh(\gamma l))}{Z_{load}(\tanh(\gamma l)) + Z_o} \qquad (1)$$

Where the input impedance of the local loop is measured from the central office, it can be assumed that the customer is on-hook (since the line is idle) and the load impedance is very high. Dividing the numerator and denominator of equation (1) by $Z_{load}$, yields:

$$Z_{in} = Z_o \frac{1 + \frac{Z_o}{Z_{load}}(\tanh(\gamma l))}{\tanh(\gamma l) + \frac{Z_o}{Z_{load}}} \qquad (2)$$

Taking the limit of equation (2) as $Z_{load}$ approaches infinity yields:

$$\lim_{Z_{load} \to \infty} Z_{in} = Z_o \frac{1}{\tanh(\gamma l)} \qquad (3)$$

Rearranging equation (3) to obtain an expression for the parameter of interest, γ1, yields:

$$\tanh(\gamma l) = \frac{Z_o}{Z_{in}} \quad (4)$$

The characteristic input impedance, $Z_o$, can be treated as a constant since only a measurable parameter having some relationship to the loss is required. It has been determined that at a specific frequency, $Z_o$, is substantially constant across different gauges of cables and types of insulation. Treating $Z_o$ as constant yields:

$$\gamma l \propto \tanh^{-1}\left(\frac{1}{Z_{in}}\right),$$

$$\alpha l \propto \mathcal{R}\left\{\tanh^{-1}\left(\frac{1}{Z_{in}}\right)\right\}.$$

Figure 5:
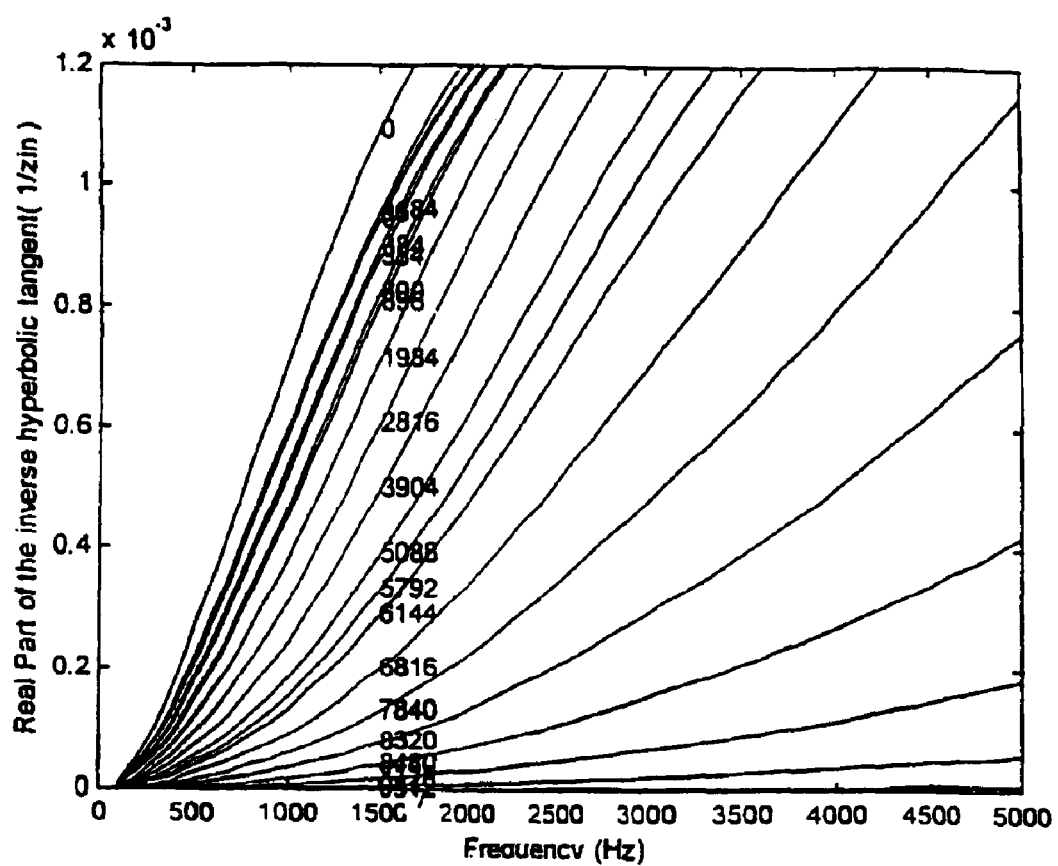
FIG. 5 is a graphical representation of the dependency of input impedance on frequency associated with data carrying capacity for a number of local loops.

The transmission capability of a cable pair can be determined experimentally by direct measurement or it can be calculated. The measurement or calculation is performed over the frequency range of interest. $RE\{\tanh^{-1}(1/Z_{in})\}$ is then calculated for each cable at each of the frequencies tested. FIG. 5 is a plot of $RE\{\tanh^{-1}(1/Z_{in})\}$ as a function of frequency for 21 loops within a frequency range of 100 Hz to 5 KHz. The interval for the frequency range is one data point every, 100 hz. Although actual physical cables could be used, the graph in FIG. 5 was created using accurate numerical routines that emulate various cable parameters including input impedance and insertion loss. For each emulated cable, the input impedance, $Z_{in}$, is calculated at each desired frequency in the frequency range. $RE\{\tanh^{-1}(1/Z_{in})\}$ is calculated and plotted as a function of frequency as shown in FIG. 5. The transmission capability (downstream data rate) of each of the emulated cables is determined by measurement. For example, the transmission capability of each loop can be measured using a real ADSL system on a loop emulator such as loop emulator model number DLS-400, available from Consultronics, Ontario, Canada.

Figure 6:
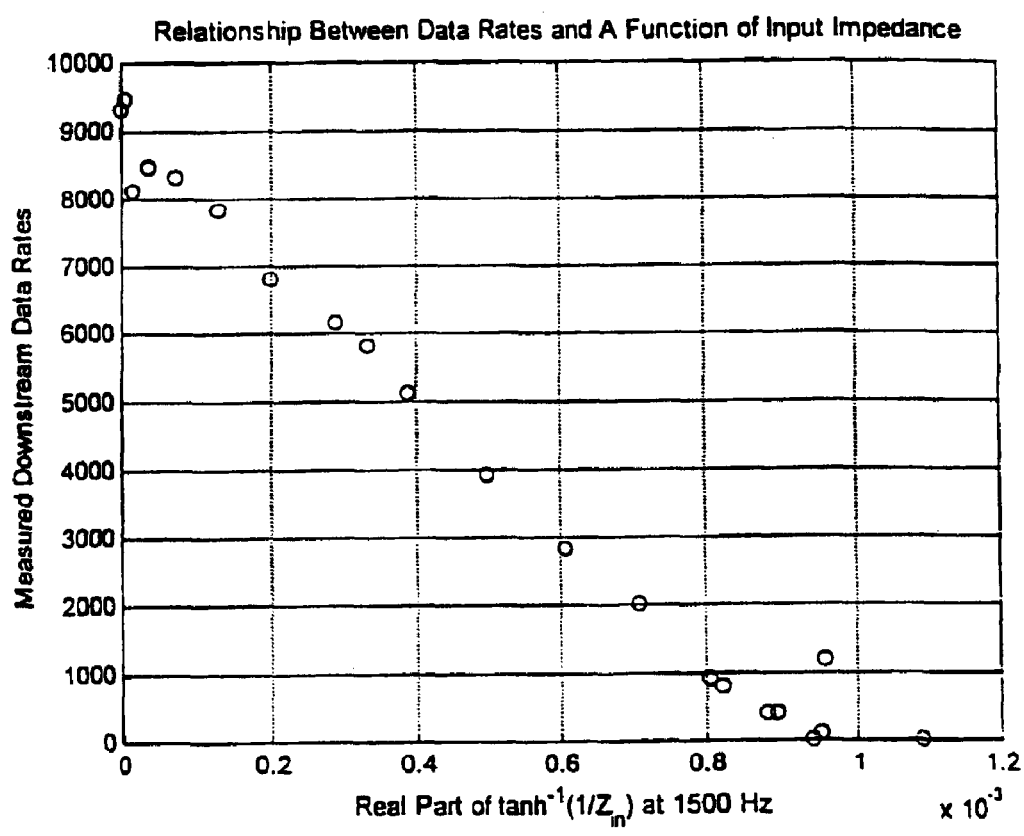
FIG. 6 is a graphical representation of the dependency of the transmission capability of a cable pair on the input impedance.

From these measurements it was determined that at 1.5 KHz a substantially linear relationship exists between $RE\{\tanh^{-1}(1/Z_{in})\}$ and the transmission capability, i.e., downstream data rate. FIG. 6 illustrates this linear relationship. Each data point represents the measured downstream data rate for the loop as a function of the loop's $RE\{\tanh^{-1}(1/Z_{in})\}$ at 1.5 KHz. It would be known to those skilled in the art that the relationship at virtually any frequency could be chosen. Preferably, the relationship is relatively smooth, for example, the relationship is substantially monotonically increasing or decreasing.

The graph in FIG. 6 is converted into a table containing entries of $RE\{\tanh^{-1}(1/Z_{in})\}$ and the corresponding estimated downstream data rate. The preferred table is given below:

| $RE\{\tanh^{-1}(1/Z_{in})\}$ | Downstream Data Rate |
| --- | --- |
| 8.4197425e−007 | 9312.0 |
| 5.1506817e−006 | 9472.0 |

-continued

| $RE\{\tanh^{-1}(1/Z_{in})\}$ | Downstream Data Rate |
| --- | --- |
| 1.6781926e−005 | 8128.0 |
| 3.9294376e−005 | 8480.0 |
| 7.5916769e−005 | 8320.0 |
| 1.2912243e−004 | 7840.0 |
| 2.0003046e−004 | 6816.0 |
| 2.8776928e−004 | 6144.0 |
| 3.3189947e−004 | 5792.0 |
| 3.8906920e−004 | 5088.0 |
| 4.9839366e−004 | 3904.0 |
| 6.0876407e−004 | 2816.0 |
| 7.1309761e−004 | 1984.0 |
| 8.0557430e−004 | 896.0 |
| 8.2228188e−004 | 800.0 |
| 9.5771281e−004 | 1184.0 |
| 8.8252758e−004 | 384.0 |
| 8.9590061e−004 | 384.0 |
| 9.4263065e−004 | 0.0 |
| 9.5265664e−004 | 96.0 |
| 1.0899387e−003 | 0.0 |

The table is entered and stored electronically, for example in a computer memory. After the table is created and stored, the following steps are used to determine the transmission rate of a particular local loop:

(1) Measure $Z_{in}$ for the local loop in a well-known manner at 1.5 KHz.

(2) Calculate $RE\{\tanh^{-1}(1/Z_{in})\}$.

(3) Determine the data rate using the value calculated in step (2) from the table stored in computer memory. Interpolation between the points that are stored in the table is required for values of $RE\{\tanh^{-1}(1/Z_{in})\}$ which fall between the values of $RE\{\tanh^{-1}(1/Z_{in})\}$ stored in the table.

Such interpolation is well-known to those skilled in the art. For example, well-known curve fitting techniques such as the least squares fit or the cubic spline fits can be used for the purpose of interpolation.

Figure 7:
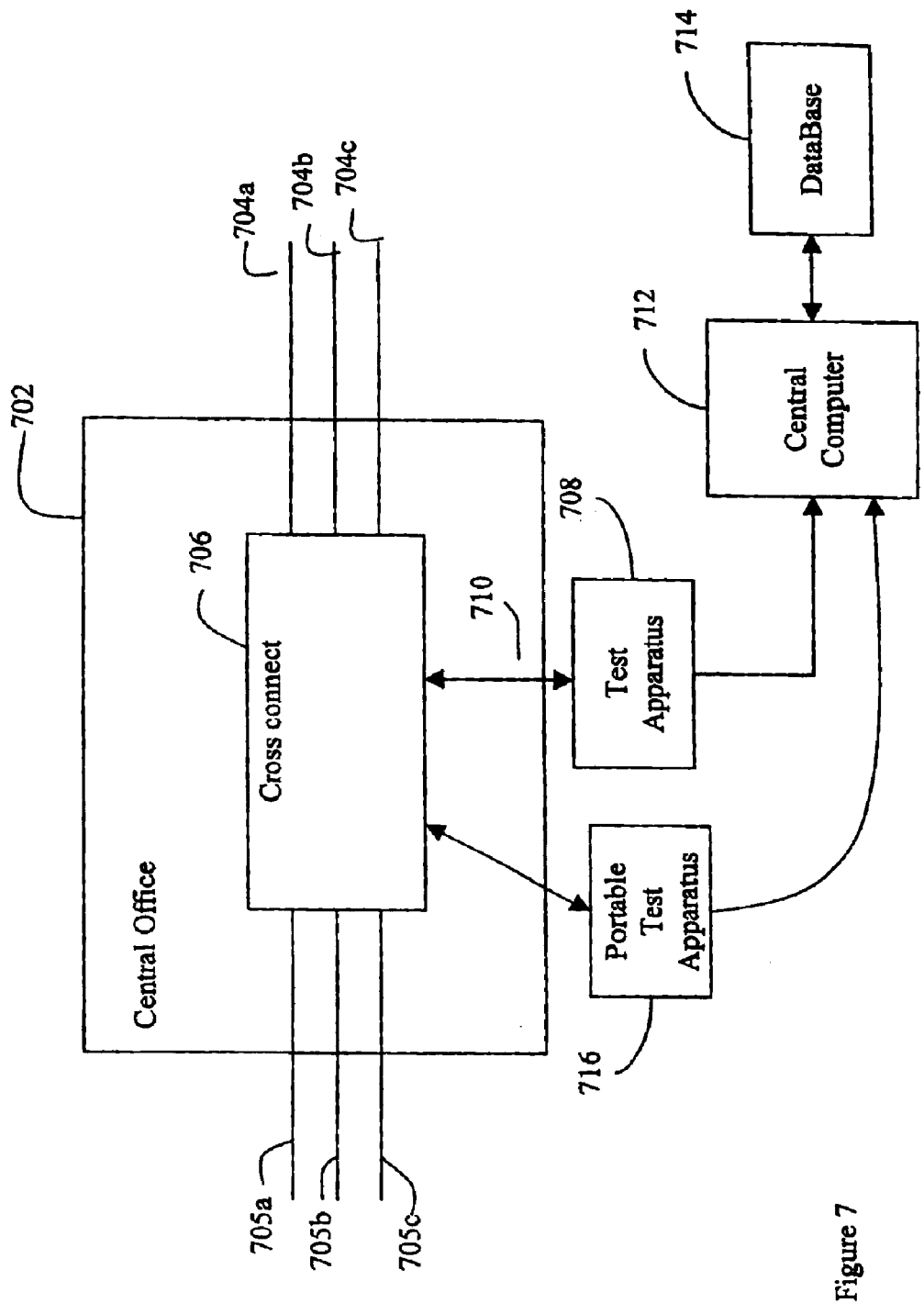
FIG. 7 is a schematic illustration of a system for testing a cable pair according to a preferred embodiment of the present invention.

The present invention can be used to test the capacity of trunk lines at a central office. Referring to FIG. 7, a central office 702 has a number of trunk lines 704a–c on which telephone traffic is carried to and from central office 702. A switching machine 706 can connect any one of trunks 704a–c to any of lines 705a–c. In addition cross-connect circuit 706 can connect any of lines 705a–c to a test apparatus 708 via NO TEST trunk 710. NO TEST trunk 710 provides metallic access to any of lines 705a–c. Test apparatus 708 can be a Mechanized Loop Testing device available from Lucent Technologies, Holmdel, N.J.

The present invention allows the determination of whether a particular line has sufficient capacity to carry high data rate communication to be made in the voiceband, for example, as described above, at 1.5 KHz. Any particular telephone line, assuming it is free, i.e., on-hook, can be tested by appropriately directing the NO TEST trunk 710 to land on that particular telephone number. Test apparatus 708 must be modified to make the calculation $RE\{\tanh^{-1}(1/Z_{in})\}$ and to perform steps (1)–(3), set forth above, to estimate the data carrying capacity of the telephone line being tested. These modifications to the test apparatus would be apparent to those skilled in the art using the disclosure provided herein.

In an alternate embodiment, a portable test apparatus 716 is used. Unlike test apparatus 708, portable test apparatus 716 must be manually connected to the cable pair for which testing is desired. Portable test apparatus 716 can be, for example, a Wilcom Model T306B Impedance Measuring Set, manufactured by Wilcom, Laconia, N.H.

To measure $Z_{in}$, test apparatus 708 transmits a signal having a frequency down the cable pair and measures the relationship of the returning voltage to current in both phase and magnitude. Preferably, the signal is a sine wave having a frequency in the voiceband. As described above, the preferred frequency is 1.5 KHz. Using the voiceband is preferable because it allows existing test trunks in current central office switches to be used. Measuring $Z_{in}$ in this manner is well-known to those skilled in the art.

In addition, in a preferred embodiment of the present invention, test apparatus 708 is configured to test every telephone number in a central office switch to determine automatically the capacity of a particular telephone line so that data carrying capacities for any telephone line are determined in advance. This test is performed by a central computer 712. Central computer 712 is operationally connected to a database subsystem 714. In a preferred embodiment, central computer 712 is a central computer connected to each central office in a particular area, for example, each central office in a particular state. Database subsystem 714 contains all of the telephone numbers for central office 702. Test apparatus 708 receives the telephone number to be tested from database subsystem 714 in a well-known manner and then tests that telephone number for transmission capacity using the steps (1)–(3) above.

Preferably, every telephone number in central office 702 is tested automatically. That is, test apparatus 708 performs a transmission capability test on the cable designated by the telephone number given by database subsystem 714. Test apparatus 708 performs the test and returns the value $RE\{\tanh^{-1}(1/Z_{in})\}$ central computer 712. Central computer 712 stores the value of $RE\{\tanh^{-1}(1/Z_{in})\}$ in database subsystem 714 so that it is associated with the tested cable to which the value corresponds. A microprocessor 718 or other computing element in test apparatus 708 is used to calculate $RE\{\tanh^{-1}(1/Z_{in})\}$.

Alternatively, test apparatus returns $Z_{in}$ to central computer 712 which then calculates $RE\{\tanh^{-1}(1/Z_{in})\}$ from the returned value. The calculated value of $RE\{\tanh^{-1}(1/Z_{in})\}$ is stored in database subsystem 714 so that is associated with the tested cable to which the value corresponds. Thus, the $RE\{\tanh^{-1}(1/Z_{in})\}$ values corresponding to each telephone number in a particular telephone system are pre-calculated (preferably calculated before a customer request for high data service) and stored in database 714 in association with their respective telephone numbers.

From these stored value of $RE\{\tanh^{-1}(1/Z_{in})\}$, the transmission capability in terms of megabits per second can be determined as described above and stored in memory corresponding to the telephone number from which they were derived so that it can be accessed by a database lookup or it can be used to derive the transmission capability algorithmically. Alternatively, the value of $RE\{\tanh^{-1}(1/Z_{in})\}$ or transmission capability corresponding to the particular telephone number under test can be stored in database 714.

In any event, when a customer desires high rate data access, a query is made to central computer 712 or database 714 to retrieve the transmission capability. If the $RE\{\tanh^{-1}(1/Z_{in})\}$ was stored, then $RE\{\tanh^{-1}(1/Z_{in})\}$ is retrieved and the transmission capability is determined by using the table of $RE\{\tanh^{-1}(1/Z_{in})\}$ and corresponding downstream data rates as described above. Once the transmission capability is determined, the customer is advised whether he or she can have that particular service. This information can be provided to the customer automatically once the database is set up.

Figure 8:
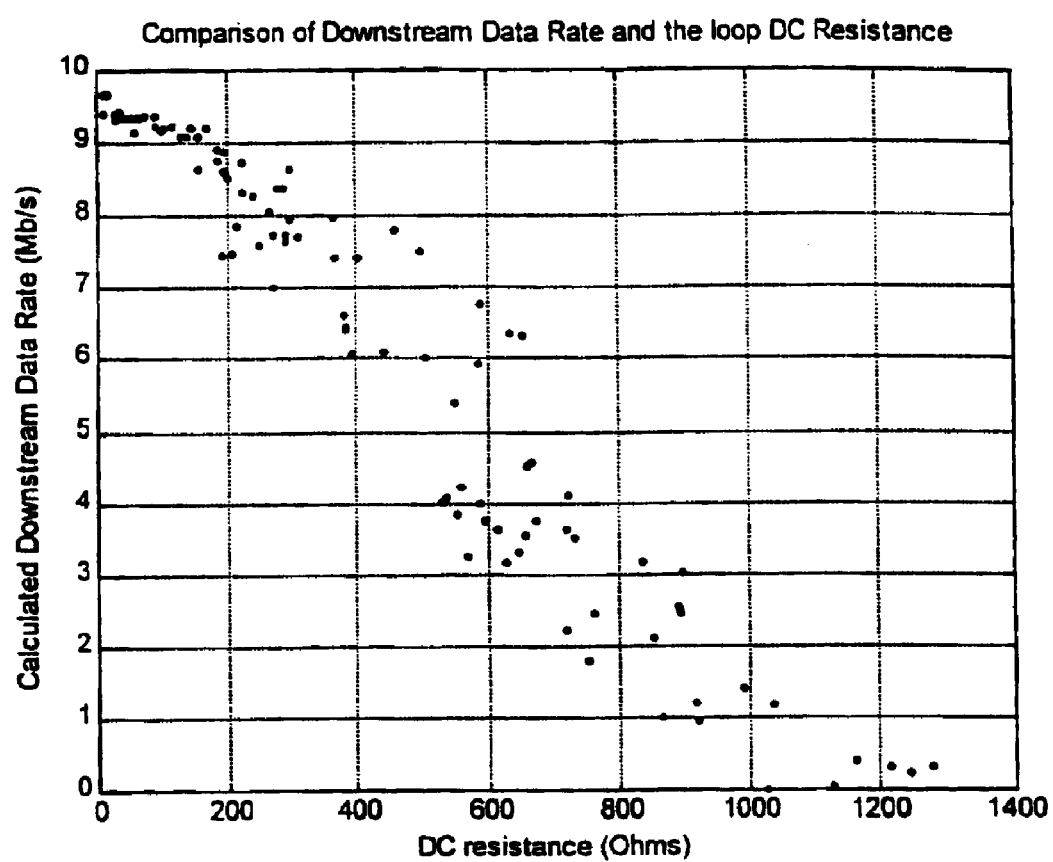
FIG. 8 is a graphical illustration of the dependency transmission capability of a cable pair on DC resistance.

The present invention can also assess the transmission capability of the cable pair using the DC resistance of the loop. That is, there is a relationship between the DC resistance of the loop and the loop's transmission capability. This relationship is shown in FIG. 8. However, measuring this DC resistance is cumbersome because it requires a service technician to go to the subscriber's site and short the end of the cable pair located at the subscriber's facility (the far end of the loop) to measure the DC resistance. The DC resistance is measured in a conventional manner using an ohmmeter.

A less cumbersome way to measure the DC resistance is to use test apparatus 708. This method requires the subscriber to call the automated test apparatus, via the switching machine using a conventional telephone call. Using techniques similar to caller ID, the test apparatus obtains the subscriber's telephone number. Then, the subscriber is prompted to hang up. Subsequently, test apparatus 708 accesses the subscriber's line using the metallic access provided by NO TEST trunk 710. Test apparatus 708 applies a ringing signal to the line. When the subscriber answers the call, test apparatus 708 measures the current in the loop. Knowing the voltage within test apparatus 708, the DC resistance of the completed circuit is calculated.

The completed circuit contains the resistance of the telephone set, the subscriber's home wiring, the loop, and NO TEST trunk 710. The resistance of the subscriber's home wiring is small and can be ignored. The resistance of NO TEST trunk 710 is constant from test to test, and thus, may be measured once and subtracted from the measurement. The remainder is the resistance of the loop and that of the telephone set.

The DC resistance of the telephone set is well bounded between 0 and 400 ohms. The median value can be used without appreciable loss of significance. This median value is subtracted from the above remainder to yield an estimate of the DC resistance of the loop.

Once the DC resistance of the loop is determined it can be used to index a table of transmission capacities. This table is similar to the table described above having entries of $RE\{\tanh^{-1}(1/Z_{in})\}$ and corresponding downstream data rates. Well-known interpolation techniques, such as cubic spline fitting or least squares fitting can be used to interpolate between entries of the table. Such a table is illustrated graphically in FIG. 8. The calculated downstream data rates are shown in megabits per second (Mb/s).

The data used to generate FIG. 8 comes from a Monte Carlo simulation. In this simulation, 100 makeups (arbitrary connections of different lengths of cable, each length having perhaps a different cable gauge) were synthesized. Each makeup was synthesized in such a manner that its makeup would be allowable using standard loop design practices. The DC resistance of the loop was calculated, using standard values of DC resistance per unit length for various wire gauges in use. The ADSL downstream data rate was also estimated for each loop, using an ADSL simulation tool.

Figure 9:
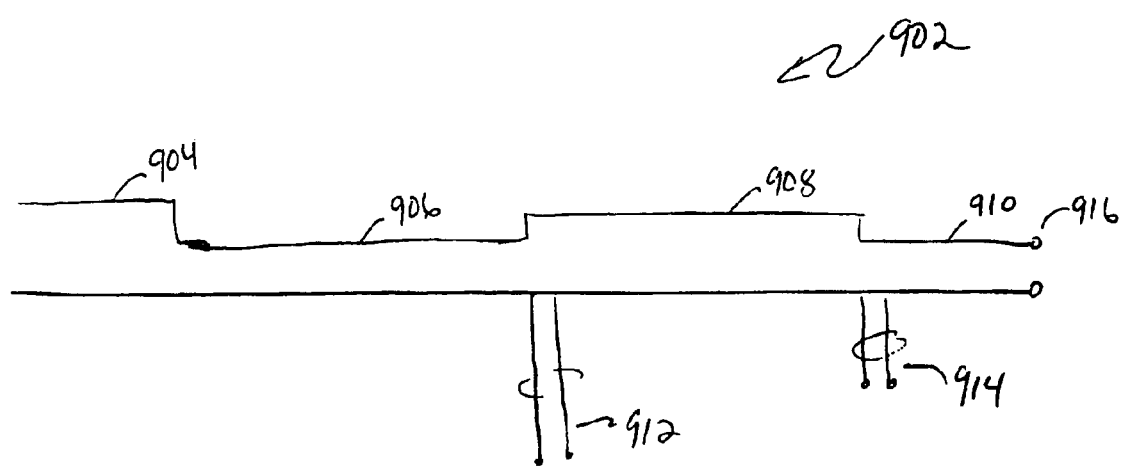
FIG. 9 is a schematic illustration of a cable that can exist in a telephone system.

The cable pair emulations described above are based on modeling a physical cable. An exemplary physical cable is physical cable 902 in FIG. 9. Referring to FIG. 9, cable 902 made up of concatenated cables 904, 906, 908 and 910. In other cables, there may be more or fewer concatenated sections, or just one section. Each of cables 904, 906, 908 and 910 can be of a different gauge wire and length. For example, cable 904 can be a 1000 foot 22 gauge cable, cable 906 can be a 3000 foot 26 gauge cable, cable 908 can be a 5000 foot 26 gauge cable and cable 910 can be a 1500 foot 24 gauge cable.

In addition, cable 902 can have unterminated access points known as bridge taps 912 and 914. Bridge tap 912 can be for example 3000 foot 22 gauge cable, while bridge tap 914 can be 785 foot 24 gauge cable. The bridge taps can have different lengths and/or gauges than those mentioned, and there may be more than two bridge taps or only one bridge tap.

Each section of physical cable 902 can be modeled by a circuit such as that shown in FIG. 4, with appropriate values of resistance R, capacitance C, inductance L and conductance G. Each parameter R, C, L and G varies depending on the length, gauge and temperature of the cable. Well-known techniques exist for determining parameters R, C, L and G given the cable length, gauge and temperature. One set of models for approximating R, C, L and G, for example, can be found in Starr, Cioffi and Silverman, Understanding Digital Subscriber line Technology (Prentice-Hall 1999). Using R, C, L and G the impedance, $Z_0$ can be determined as:

$$Z_0 = \sqrt{\frac{R + j\omega L}{G + j\omega C}} \qquad (1)$$

The parameter gamma ($\gamma$) can be determined as:

$$\gamma = \sqrt{(R+j\omega L)(G+j\omega C)} \qquad (2)$$

Knowing $Z_0$ and $\gamma$, one can calculate an equivalent circuit model of the cable using A, B, C, D parameters from the following:

$$\begin{bmatrix} A & C \\ B & D \end{bmatrix} = \begin{bmatrix} \cosh(\gamma l) & \frac{\sinh(\gamma l)}{Z_o} \\ Z_o \sinh(\gamma l) & \cosh(\gamma l) \end{bmatrix}.$$

The A, B, C and D parameters are used to model each section of the cable. To determine the properties of the entire cable, the section models are multiplied together (i.e., chained together). For example, the above cable is modeled as:

$$\begin{bmatrix} A_{TOT} & C_{TOT} \\ B_{TOT} & D_{TOT} \end{bmatrix} = \begin{bmatrix} A_{904} & C_{904} \\ B_{904} & D_{904} \end{bmatrix} \cdot \begin{bmatrix} A_{906} & C_{906} \\ B_{906} & D_{906} \end{bmatrix}. \qquad (3)$$

$$\begin{bmatrix} A_{908} & C_{908} \\ B_{908} & D_{908} \end{bmatrix} \cdot \begin{bmatrix} A_{910} & C_{910} \\ B_{910} & D_{910} \end{bmatrix}$$

where the $A_{9xx}$, $B_{9xx}$, $C_{9xx}$ and $D_{9xx}$ are the A, B, C and D parameters for the 9xx section of the cable illustrated in FIG. 9. The section models are chained together as required to model any subsection of the cable or the entire cable. It should be noted that the bridge taps are treated differently because they are unterminated. This different treatment is well known in the art. For more details regarding the above modeling, see chapter 3 of Dr. Walter Y. Chen, *DSL Simulation Techniques and Standards Development for Digital Subscriber Lines* (MacMillan Technical Publishing 1998), which is hereby incorporated by reference herein in its entirety.

The multiplication identified in Equation (3) is carried out, which results in a total set of A, B, C and D parameters, for example:

$$\begin{bmatrix} A_{TOT} & C_{TOT} \\ B_{TOT} & D_{TOT} \end{bmatrix}.$$

From this final set of A, B, C and D parameters, the input impedance of the cable can be calculated at a specific frequency, $\omega$, as $$Z_{in} = \frac{A + \frac{B}{Z_{load}}}{C + \frac{D}{Z_{load}}}.$$

The calculations a frequency specific because the A, B, C and D parameters are functions of frequency, $\omega$, as shown in Equations (1) and (2). This calculation of $Z_{in}$ assumes that the cable 902 is terminated at its far end, end 916 (i.e., in $Z_{load}$).

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for estimating a data carrying capacity of a local loop associated with a subscriber, comprising the steps of:
   (a) providing a test apparatus in a central office to measure a transmission characteristic of the local loop in a voice frequency;
   (b) measuring the transmission characteristic of the local loop while the local loop is in an on-hook condition;
   (c) determining a plurality of modeled transmission characteristics by modeling one or more cables;
   (d) measuring the data carrying capacity corresponding to the plurality of determined transmission characteristics by operating a digital subscriber line system connected to an emulator that emulates the cables having the transmission characteristics;
   (e) generating a data table with a plurality of entries each entry associating the transmission characteristic with the data carrying capacity measured when emulating the cable having the transmission characteristic; and
   (f) determining a data carrying capacity of the local loop by applying the measured transmission characteristic of the local loop to the data table having the plurality of entries corresponding to the modeled transmission characteristics and associated data carrying capacities for converting the measured transmission characteristic of the local loop to a data carrying capacity.

2. The method recited in claim 1, wherein the step of generating the data table, comprises the steps of:
   determining a value of the transmission characteristic for each of a plurality of frequencies for each of the plurality of modeled cables being emulated;
   determining a data carrying capacity corresponding to the measured transmission characteristic at a particular frequency for each of the plurality of modeled cables being emulated; and
   storing the measured transmission characteristic at the particular frequency and the corresponding determined data carrying capacity for each of the plurality of modeled cables being emulated in a separate entry in the data table.

3. The method recited in claim 2, further comprising the step of choosing as one of the particular frequencies, a frequency wherein the transmission characteristic determined for the plurality of modeled cables is substantially linear.

4. The method recited in claim 1, further comprising the step of interpolating between entries in the data table to estimate the data carrying capacity of the local loop.

5. The method of claim 1, wherein $Z_{in}$ represents an input impedance of the local loops and the modeled cables, and wherein the measured transmission characteristics and the determined transmission characteristics comprise RE$\{\tanh^{-1}(1/Z_{in})\}$.

6. A method for responding to a subscriber request for high data rate access, comprising the steps of:
   (a) determining a plurality of transmission characteristics by modeling one or more cables;
   (b) generating a data carrying capacity table having a plurality of entries, each entry comprising a value of a transmission characteristic and a corresponding data carrying capacity, the data carrying capacity table being generated by emulating the plurality of transmission characteristics of the one or more cables with a cable emulator and operating a digital subscriber line system connected to the emulator to measure the data carrying capacity for each of the plurality of transmission characteristics being emulated;
   (c) measuring a transmission characteristic in a voice frequency for a plurality of local loops coupled to a central office using a measuring apparatus located at the central office;
   (d) determining a data carrying capacity of each of the plurality of local loops by applying the measured transmission characteristic for each of the plurality of local loops to the data carrying capacity table;
   (e) storing the determined data carrying capacity and a local loop identifier for each of the plurality of local loops in a local loop capacity table;
   (f) receiving the subscriber request for high data rate access;
   (g) determining a local loop identifier associated with a local loop corresponding to the subscriber making the request for high data rate access;
   (h) determining a data carrying capacity of the local loop corresponding to the subscriber by accessing the local loop capacity table using the local loop identifier associated with the local loop; and
   (i) responding to the subscriber request for high data rate data in accordance with the determined data carrying capacity.

7. The method recited in claim 6, wherein the step of generating the data carrying capacity table comprises the steps of:
   determining a data carrying capacity corresponding to the measured transmission characteristic at a particular frequency for each of the plurality of modeled cables being emulated; and
   storing the measured transmission characteristic at the particular frequency and the corresponding determined data carrying capacity for each of the plurality of modeled cables being emulated in a separate entry in the data table.

8. The method recited in claim 7, further comprising the step of choosing as the particular frequency, a frequency wherein the transmission characteristic determined for the plurality of modeled cables being emulated is substantially linear.

9. The method recited in claim 6, further comprising the step of interpolating between entries in the data table to estimate the data carrying capacity of each local loop.

10. The method of claim 6, wherein $Z_{in}$ represents an input impedance of the local loops and the modeled cables, and wherein the measured transmission characteristics and the determined transmission characteristics comprise RE$\{\tanh^{-1}(1/Z_{in})\}$.

11. A system for estimating a data carrying capacity of a local loop associated with a subscriber, comprising:
   a test apparatus in a central office to measure a transmission characteristic in a voice frequency of a local loop in an on-hook condition; and
   a computer coupled to the test apparatus to determine a data carrying capacity of the local loop, the computer having a computer memory; and
   a data table stored in the computer memory, the data table having a plurality of entries for converting the measured transmission characteristic to a data carrying capacity, the plurality of entries generated by modeling a plurality of local loops having different cable parameters to determine transmission characteristics, emulating cables having the transmission characteristics on a cable emulator, and measuring the data carrying capacity for the transmission characteristics of the emulated cables by operating a digital subscriber line system connected to the cable emulator, wherein the computer applies the measured transmission characteristic to the data table to determine the data carrying capacity of the local loop.

12. The system recited in claim 11, further comprising means for generating the data table, wherein the means for generating the data table comprise:
   means for determining a value of the transmission characteristic for each of a plurality of frequencies for each of the plurality of modeled cables being emulated;
   means for determining a data carrying capacity corresponding to the measured transmission characteristic at a particular frequency for each of the plurality of modeled cables being emulated; and
   means for storing the measured transmission characteristic at the particular frequency and the corresponding determined data carrying capacity for each of the plurality of modeled cables being emulated in a separate entry in the data table.

13. The system recited in claim 12, wherein the means for generating the data table utilizes as one of the particular frequencies, a frequency wherein the transmission characteristic determined for the plurality of cables is substantially linear.

14. The system recited in claim 11, further comprising means for interpolating between entries in the data table to estimate the data carrying capacity of the local loop.

15. The system recited in claim 11, wherein the test apparatus automatically estimates a data carrying capacity of a plurality of local loops in an on-hook condition, further comprising storage means for storing the estimate of the data carrying capacity of each local loop along with a local loop identifier that identifies the local loop corresponding to each stored estimate of data carrying capacity, the local loop identifier to be used as an index for the storage means to obtain the stored data carrying capacity of the local loop corresponding to the local loop identifier.

16. The system of claim 11, wherein $Z_{in}$ represents an input impedance of the local loops and the modeled cables, and wherein the measured transmission characteristics and the determined transmission characteristics comprise RE$\{\tanh^{-1}(1/Z_{in})\}$.

* * * * *